United States Patent [19]
Kida et al.

[11] Patent Number: 5,293,253
[45] Date of Patent: Mar. 8, 1994

[54] FACSIMILE APPARATUS FOR RECEIVING FACSIMILE TRANSMISSION SELECTIVELY

[75] Inventors: Yasushi Kida, Fukuoka; Koichiro Maemura, Isehara, both of Japan

[73] Assignee: Ricoh Company, Ltd., Tokyo, Japan

[21] Appl. No.: 593,881

[22] Filed: Oct. 5, 1990

[30] Foreign Application Priority Data

Oct. 6, 1989 [JP] Japan .................. 1-261383
Jul. 30, 1990 [JP] Japan .................. 2-202302

[51] Int. Cl.⁵ .................................... H04N 1/00
[52] U.S. Cl. .................... 358/440; 358/404; 358/439
[58] Field of Search ........... 379/100, 199; 358/404, 358/405, 434, 435, 436, 437, 440, 444; 380/23, 25

[56] References Cited

U.S. PATENT DOCUMENTS

| | | | |
|---|---|---|---|
| 4,353,097 | 10/1982 | Takeda et al. | 379/100 |
| 4,447,676 | 5/1984 | Harris et al. | 379/199 |
| 4,583,124 | 4/1986 | Tsuji et al. | 358/440 |
| 4,764,951 | 8/1988 | Kotani et al. | 379/100 |

FOREIGN PATENT DOCUMENTS

01-74868 3/1989 Japan .
02-15154 8/1989 Japan .................. 358/404

Primary Examiner—Jin F. Ng
Assistant Examiner—Ping Wong
Attorney, Agent, or Firm—Oblon, Spivak, McClelland, Maier & Neustadt

[57] ABSTRACT

A facsimile apparatus comprises a communication control unit for establishing a connection, the communication control unit sending station identification data to a calling station and receiving station identification data from a called station for identification of the station, an image data transmission and reception unit, an image reading unit, an image recording unit, a memory for storing the station identification data of selected stations; and a memory control unit for controlling the memory such that, when a call is made to a called station, the station identification data that is returned from the called station is stored in the memory as the station identification data of the selected stations. The communication control unit rejects reception of the image data transmitted from the calling station when the calling station is not included in a list of stations stored in the memory.

10 Claims, 10 Drawing Sheets

FACSIMILE APPARATUS FOR RECEIVING FACSIMILE TRANSMISSION SELECTIVELY

BACKGROUND OF THE INVENTION

The present invention generally relates to facsimile apparatuses, and more particularly to a facsimile apparatus for receiving facsimile transmissions selectively upon discrimination of a calling station.

With the wide-spread use of facsimile apparatus, the function of facsimile apparatus has been improved and augmented significantly. For example, there is a facsimile apparatus that can receive a facsimile transmission and print the content of transmission automatically on a recording sheet without intervention of an operator. Further, there is a facsimile apparatus having the capability of broadcasting transmissions wherein a document is transmitted to a plurality of destinations automatically one after another.

With such a wide-spread use of facsimile apparatus and improvements in their function, there arises a problem or inconvenience such as the facsimile apparatus receives unnecessary or unwanted facsimile transmission, like an advertisement. Such unwanted facsimile transmission wastes the recording sheet.

In order to cope with such a problem, a facsimile apparatus is proposed as disclosed in the Japanese Patent Publication No.64-74868 in which telephone numbers of facsimile apparatus are registered in a memory and the facsimile apparatus carries out comparison of the telephone number of the calling station with the telephone number registered in the memory. The facsimile apparatus accepts the transmission only when the telephone number of the calling station is included in the list of telephone numbers that is stored in the memory as the closed user group. When the telephone number of the calling station does not agree, the reception of the facsimile transmission is rejected. Further, there is proposed a facsimile apparatus wherein a terminal identification code of a calling station that is transmitted with the facsimile transmission from the calling station is compared with the terminal identification codes that are stored in the memory and accepts the facsimile transmission only when the transmitted terminal identification code agrees with the stored terminal identification code.

In any of these previous facsimile apparatuses, the identification code of the station or user in the closed user group has to be inputted into the memory by the operator who operates the keyboard or other inputting device of the facsimile apparatus.

In such a conventional facsimile apparatus, however, there has been a problem, caused as a result of the manual inputting of the identification information such as the telephone number or terminal identification code, such that the registration process of the identification information is tedious and inconvenient. Further, there has been a problem in that the rejection of the facsimile transmission is not reported to the operator even when a facsimile transmission is rejected. The information about the terminal that has sent the rejected facsimile transmission is not brought to the operator, either. As a result, facsimile transmissions that are useful, desired or essential for the user of the facsimile apparatus may be rejected without being noticed when the terminal code or the identification code of the calling station is not registered. Obviously, such a deficiency may lead to a disastrous result of failing to receive important or critical facsimile transmissions in time.

SUMMARY OF THE INVENTION

Accordingly, it is a general object of the present invention to provide a novel and useful facsimile apparatus wherein the aforementioned problem is eliminated.

Another and more specific object of the present invention is to provide a facsimile apparatus wherein closed user identification information is stored in the memory at the time a facsimile transmission is made to the called station in the form of therefor a numeric code or character code. Thereby, the manual inputting process by the operator for inputting the closed user group identification information is eliminated, and the selective reception of facsimile transmission from the stations that are registered as the closed user group can be utilized without difficulty.

Another object of the present invention is to provide a facsimile apparatus that discriminates, at the time of facsimile transmission to a called station, whether the communication mode of the called station is the standard mode or non-standard mode based upon the facsimile control signal returned therefrom. The facsimile apparatus stores thereby the station identification information such as the CSI or RTI signals returned from the called station in a memory together with the communication mode of the called station for the closed user group connection. According to the present invention, not only the manual inputting of the terminal identification information by the operator is eliminated but it is also achieved the selective reception of facsimile transmission from the registered, closed user group station automatically in any of the transmission mode.

Another object of the present invention is to provide a facsimile apparatus wherein the information about the calling station is outputted in a predetermined format upon rejection of the reception of facsimile transmission, together with the fact that the facsimile transmission is rejected. According to the present invention, the operator can register the station that has sent the rejected transmission in the closed user group list based upon the outputted information when the station is the one that should be registered in the closed user group.

Other objects and further features of the present invention will become apparent from the following detailed description when read in conjunction with the attached drawings.

DETAILED DESCRIPTION

Figure 1:
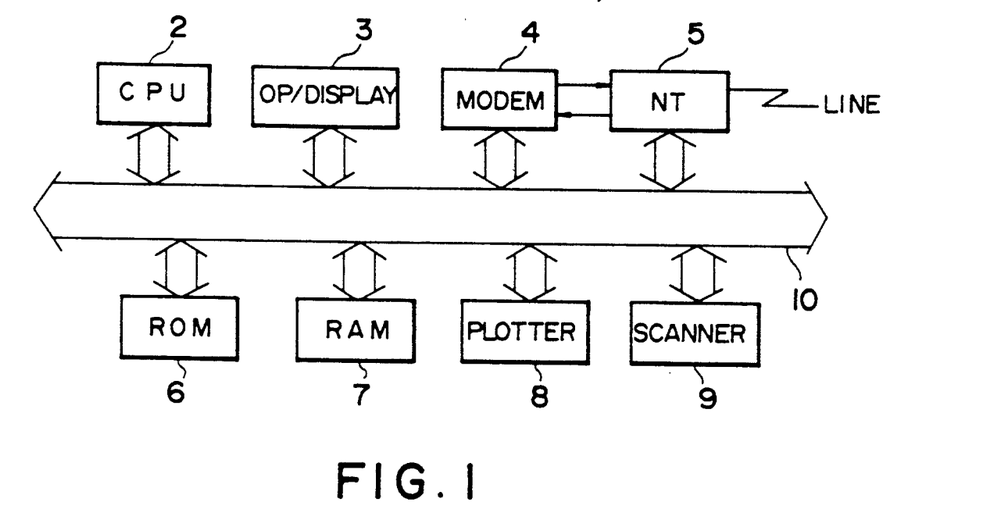
FIG. 1 is a block diagram showing a first example of the facsimile apparatus according to the present invention.

FIG. 1 shows the block diagram of a facsimile apparatus 1 forming a first embodiment of the present invention.

Referring to the drawing, the facsimile apparatus 1 is provided with a central processing unit (CPU) 2, an operating/display part 3, a modem 4, a network controller 5, a read-only memory (ROM) 6, a random-access memory (RAM) 7, a plotter 8 and a scanner 9 connected with each other by a system bus 10.

The ROM 6 stores the basic control program of the facsimile apparatus 1 as usual. Further, the ROM 6 stores therein a program for the selective reception of facsimile transmissions or so-called closed user connection and a program for registering the called station identification information as will be described later in detail. The CPU 2 controls each part of the facsimile apparatus 1 in accordance with the program in the ROM 6 and carries out the predetermined facsimile transmission procedure. Further, in accordance with the program for the closed user connection, the CPU 2 controls the facsimile apparatus such that only the facsimile transmission that has been transmitted from the station included in the list is selectively received. Further, the CPU 2 controls the facsimile apparatus and registers the called station identification information in to the RAM 7.

The operation/display part 3 is provided with a keyboard and a display for manual inputting of various commands and data and for displaying of various information for review by the user. The modem 4 is used to modulate the carrier according to the facsimile data under transmission and to recover the transmitted facsimile data by demodulating. The network controller 5 is physically connected to a network L such as a public telephone network and carries out usual automatic call-out and call-in.

The RAM 7 has a predetermined memory capacity and stores various control data necessary for controlling the facsimile apparatus such as identification data of destination stations or image data. In the facsimile apparatus having the capability of operating in the CUG (Closed User Group) mode wherein the facsimile apparatus rejects reception of facsimile transmissions from stations that are not included in the closed user group, the RAM 7 is further defined with a CUG area wherein CSI or RTI data that is the station identification information to be described later is stored for various stations in the closed user group. The process for registering the CSI/RTI information in the RAM 7 will be described later.

Further, the facsimile apparatus 1 uses the plotter 8 that may be a conventional thermal printer wherein images are recorded on a thermal recording sheet either directly or via an ink sheet. Further, the scanner 9 may be a conventional Charge-Coupled-Device (CCD) line scanner that reads the image on a sheet line by line and produces an image signal indicative of the image.

Next, the operation of the facsimile apparatus 1 will be described with reference to FIGS. 3-7. The facsimile apparatus 1 has a feature in that it stores automatically the station identification information such as CSI or RTI data that is returned from a called station upon calling, in the CUG area of the RAM 7.

Figure 3:
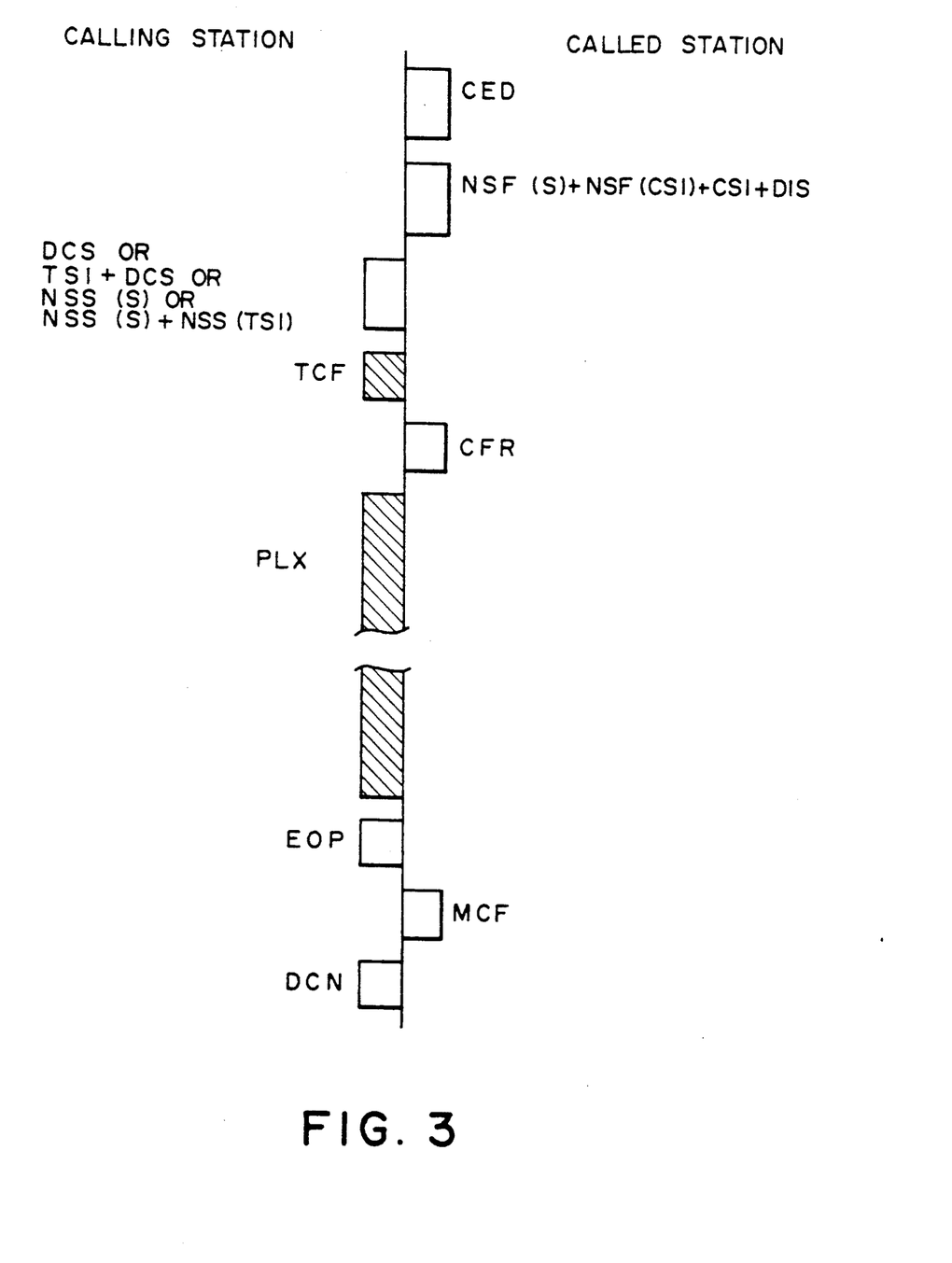
FIG. 3 is a diagram showing a operational sequence of the facsimile apparatus of FIG. 1.

FIG. 3 shows the general procedure of facsimile transmission between a facsimile apparatus in a calling station and a facsimile apparatus in a called station. The facsimile transmission may be made in the standard mode or in the non-standard mode procedure prescribed in the CCITT recommendation. In operation, the facsimile apparatus in the called station transmits the usual CE (Called Station Identification) signal and the NSF (Non-Standard Facilities) signal defined in the CCITT recommendation T.30 upon call-in from the facsimile apparatus at the calling station. Thereby, the facility of the called station is notified to the calling station by the NSF(S) signal that is the NSF signal added with the information about the facility of the called station. Further, the identification of the called station is notified to the calling station by the NSF(CSI) signal that is the NSF signal added with the identification information of the called station. Here, it should be noted that the facility of the called station and the identification of the called station added to the NSF signal are represented by the character code and may be added after the standard NSF signal. This identification data represented by the character code will be referred to hereinafter as RTI data. Further, the usual CSI (Called Subscriber Identification) signal and the DIS (Digital Identification Signal) signal are issued as usual by the facsimile apparatus at the called station. The CSI signal is the standard, CCITT prescribed signal and represented by the numeric characters "0"–"9," a space code and "+" and identifies the station by the telephone number and the like.

After the foregoing step, the facsimile apparatus at the calling station transmits the DCS (Digital Command Signal) and TSI (Transmitting Subscriber Identification) signals. Alternatively, the NSS (TSI) signal that is the prescribed NSS (Non-Standard Set-up) signal added with the calling station identification information and the NSS(S) signal that is the NSS signal added with the capability of the facsimile apparatus at the calling station may be transmitted. The calling station identification information added to the NSS signal may be the RTI data represented by the character code. Thereby, the identification of the calling and called stations and the recognition about the capability of facsimile apparatuses in the stations are established.

Next, the TCF (Training Check) signal is transmitted by the calling station and the CFR (Confirmation to Receive) signal is returned by the called station as usual. Upon reception of the CFR signal, the calling station transmits the facsimile image data PLX and the EOP (End of Page) signal to the called station as usual, and the facsimile apparatus at the called station returns the MCF (Message Confirmation) signal in response thereto. Further, the facsimile apparatus at the calling station issues the DCN (Disconnect) signal and the connection between the calling station and the called station is disconnected.

Next, the operation of the facsimile apparatus 1 for extracting the RTI data or CSI data from the NSF(CSI) signal or the CSI signal that is returned from the called station upon calling and registering the extracted signals in the CUG area in the RAM 7 will be described with reference to the flowchart of FIG. 4.

Figure 4:
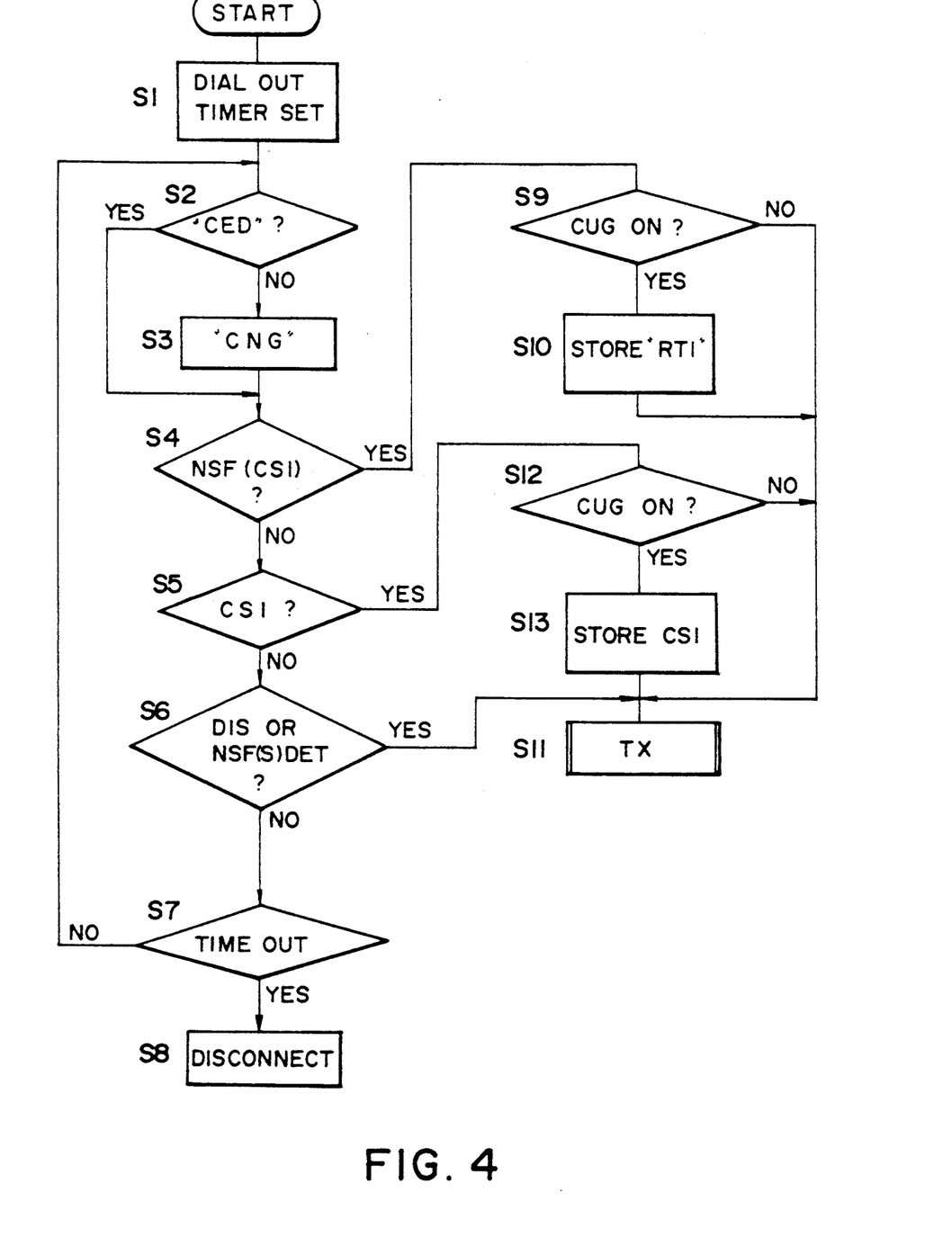
FIG. 4 is a flowchart showing the transmission procedure carried out in the facsimile apparatus of FIG. 1.

Referring to FIG. 4, the facsimile apparatus 1 sets up the dial output timer in a step S1 and detects if there is an incoming CED signal in a step S2. When there is no CED incoming, the apparatus 1 transmits the CNG (Calling Tone) signal in a step S3. On the other hand, when there is an incoming CED, a detection for the NSF(CSI) is made in a step S4. If there is no incoming NSF(CSI) signal, then a detection for the CSI signal is made in a step S5. When there is no CSI signal detected, then a detection for the DIS or NSF(S) signal is made in a step S6. Further, the steps S2–S6 are repeated until the NSF(CSI) or the CSI signal is detected or until the timer set in the step S1 times out. When the timer times out, the connection between the stations is disconnected.

On the other hand, when an incoming NSF(CSI) signal is detected in the step S4, a discrimination is made in a step S9 to discriminate whether the facsimile apparatus 1 is operated under the CUG mode or not. When the result is NO, indicating that the facsimile apparatus is ready to receive facsimile transmission from any station, a normal transmission process in a step 11 is carried out immediately.

When the facsimile apparatus is operated to receive the facsimile transmission selectively from the station listed in the closed user group, on the other hand, the result of discrimination in the step S9 assumes the state YES, and the RTI data returned from the called station by the NSF(CSI) signal is extracted and registered into the CUG area of the RAM 7 in a step S10. After the step S10, the facsimile apparatus carries out the ordinary transmission in the step S11.

In the case when a CSI signal is detected in the step S5, a step S12 is made wherein it is discriminated whether the facsimile apparatus 1 is operated in the CUG mode or not. If NO, the transmission process in the step S11 is carried out immediately. When the result is YES, indicating that the facsimile apparatus 1 is operated in the CUG mode, the CSI signal returned from the called station itself is registered into the CUG area of the RAM 7 in a step S13. After this, the ordinary facsimile transmission is made in the step S11.

The setting of the facsimile apparatus in the CUG mode or releasing of the facsimile apparatus from the CUG mode may be made by the operator through the keyboard in the operating/display part 3.

Figure 5:
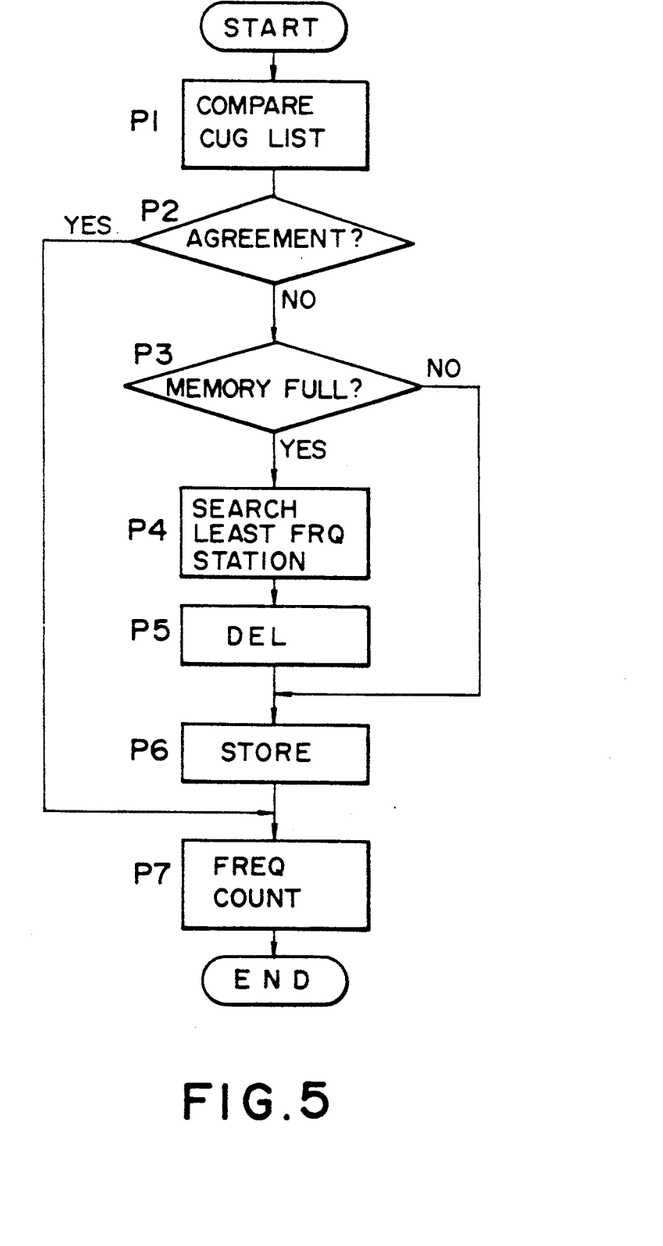
FIG. 5 is a flowchart showing the registration process for registering the transmitting party identification information.

Next, the registration process of the called station identification data transmitted by the RTI or CSI signal into the CUG area of the RAM 7 will be described with reference to FIG. 5.

In a first step P1, the RTI data that has been extracted from the NSF(CSI) signal in the step S9 or the CSI data that has been recovered from the CSI signal in the step S13 of FIG. 4 are compared with the data already stored in the CUG area of the RAM 7. When the newly extracted RTI or CSI data does not agree with the data already registered in the CUG area, it is discriminated in a step P2 that the RTI or CSI data is not yet registered in the CUG area of the RAM 7. Further, a discrimination is made in a step P3 whether the CUG area is full or not, and if the result is NO, the data is stored in the CUG area in a step P6. On the other hand, when it is discriminated that the area is full in the step P3, then the data in the CUG area for the station that has made transmission with the least frequency in the past is searched in a step P4. For this purpose, the number of transmissions that have been received is stored in the CUG area for each station together with the RTI or CSI data. Further, the data thus searched is erased from the CUG area in a step P5, and the newly extracted RTI data or the CSI data is stored in the empty space thus formed in the CUG area in the step P6. After the registration in the step P6, the number of communications with the station is updated by one. On the other hand, when it is discriminated in the step P2 that the newly received RTI or CSI data agrees with the data already stored in the CUG area of the RAM 7, then the step P7 is carried out immediately, whereby the updating of the number of transmissions that has occurred in the past is updated.

As described heretofore, the facsimile apparatus 1 of the present embodiment has the capability of registering the station identification information that has been returned from the called station upon calling, automatically in a list of the CUG stations in the RAM 7. Thereby, the manual inputting process of the operator to register the station identification information into the RAM 7 is eliminated and the use of the CUG mode of the facsimile apparatus becomes easier. Further, the doubled registration of the station identification information is positively eliminated by checking the overlapping of the newly extracted or recovered station identification information with the data that have been already stored in the CUG area. Further, the present embodiment has the feature in that, when the CUG area becomes full, the station identification information of the stations that made communications with the least frequency is erased from the CUG area to make room in the RAM 7. Thereby, the facsimile apparatus learns the frequency of communication for each station and the CUG connection can be used efficiently.

Figure 6:
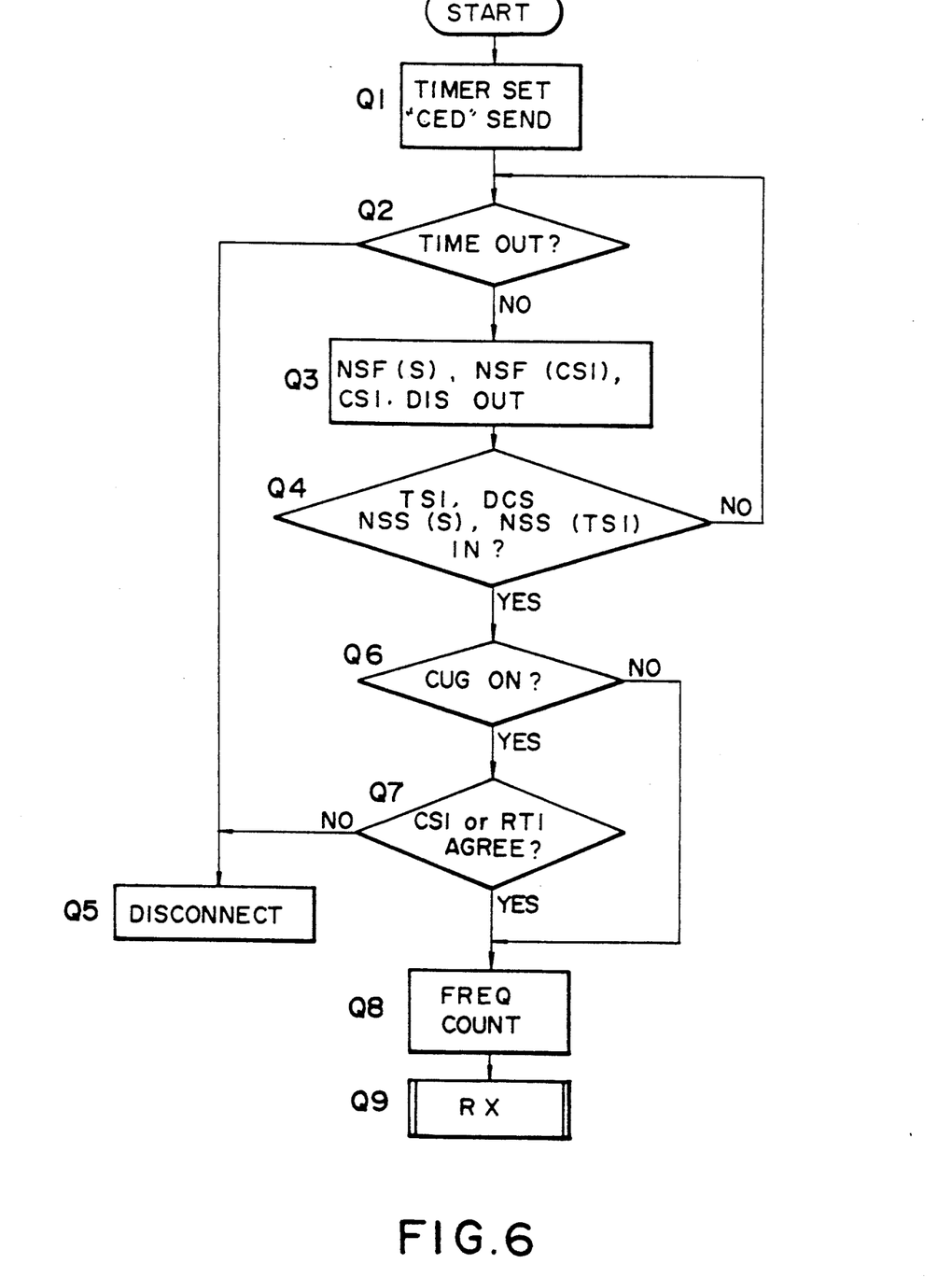
FIG. 6 is a flowchart showing the process of selective reception of facsimile transmission using the transmitting party identification information inputted in the process of FIG. 5.

FIG. 6 shows the process of the CUG connection carried out by a facsimile apparatus in a called station in the form of flowchart.

Referring to FIG. 6, in a first step Q1, a timer is started upon reception of a call and the CED signal is returned as usual.

Next, in a step Q2, the timer is checked and if it is not timed out yet, the NSF(S), NSF(CSI), CSI and the DIS signals are returned to the calling station in a step Q3. Further, in a step Q4, the incoming of the signals such as TSI, DCS, NSS(S) and NSS(TSI) is monitored. The steps Q2–Q4 are repeated until the timer times out. When the TSI, DCS, NSS(S) and the NSS(TSI) signals from the calling station are detected in the step Q4 while the timer set in the step Q1 is still running, a discrimination is made in a step Q6 whether the CUG mode of the facsimile apparatus is enabled or not. On the other hand, when the reception of the TSI, DCS, NSS(S), NSS(TSI) signals from the calling station has failed, the connection is disconnected in a step Q5.

If the result of discrimination in the step Q6 is YES, the CSI or RTI data is recovered from the received TSI or NSS(TSI) signal in a step Q7 and a discrimination is made whether the CSI data or the RTI data thus recovered agrees with the one stored in the CUG area of the RAM 7. If there is no agreement in the step Q7, then the step Q5 is carried out and the connection is disconnected. Alternatively, the facsimile apparatus may be switched to the memory reception mode for receiving facsimile transmission into the RAM 7. By doing so, the unwanted waste of the recording sheet is avoided. On the other hand, when there is an agreement between the received CSI or RTI data and the data stored in the CUG area, the number or frequency of communication that has occurred between the calling station is updated in a step Q8 and the normal reception is carried out in a step Q9.

Further, when it is discriminated that the CUG mode is disabled in the step Q6, then the updating of the frequency in the step Q8 is carried out immediately and the reception in the step Q9 is carried out subsequently.

Next, a second embodiment of the present invention will be described with reference to FIGS. 7-10.

Figure 7:
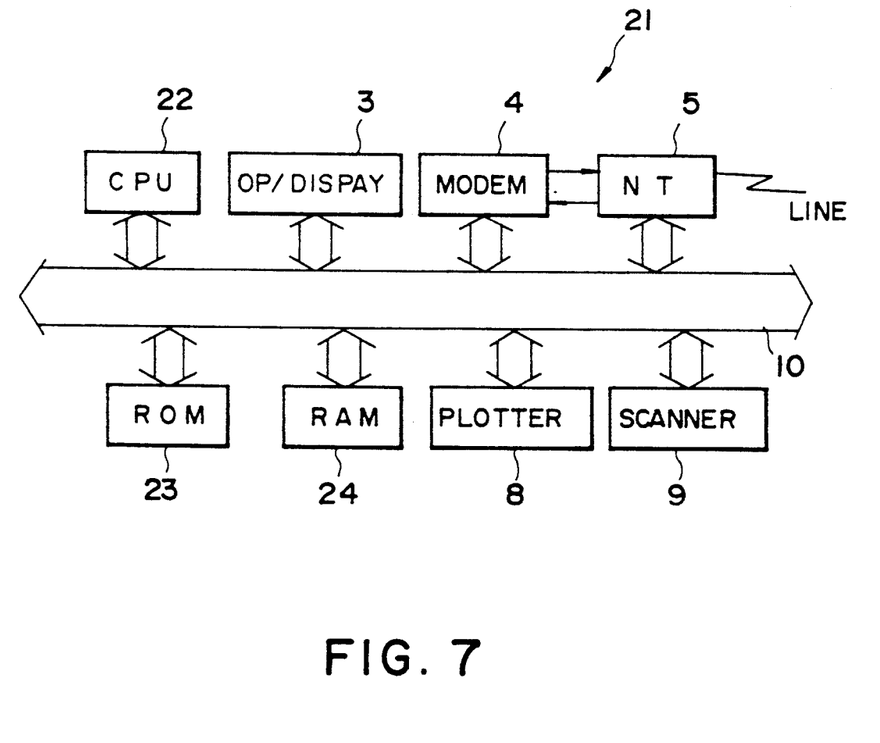
FIG. 7 is a block diagram showing a second embodiment of the facsimile apparatus of the present invention.

Referring to FIG. 7 showing the general construction of a facsimile apparatus 21 that is the facsimile apparatus of the second embodiment, the facsimile apparatus 21 comprises a CPU 22, a ROM 23 and a RAM 24 in addition to the operation/display part 3, modem 4, network controller 5, plotter 8 and the scanner 9 that are described already with reference to the facsimile apparatus 1 in FIG. 1.

The ROM 23 stores the control program for controlling the facsimile apparatus 21 and the station information registration program to be described later, and the CPU 22 controls each part of the facsimile apparatus 21 according to the programs in the ROM 23.

The RAM 24 stores the station identification information similarly to the RAM 7 of the first embodiment. In the RAM 24, the memory area for storing the station identification information is divided into the standard mode area and the non-standard mode area, and the station identification information is stored in any of the standard mode area or the non-standard mode area depending on the communication mode used for facsimile transmission.

Next, the operation of the facsimile apparatus 21 will be described. The facsimile apparatus 21 has the feature of carrying out closed user group connection in the communication mode that corresponds to the function of the facsimile apparatus 1. Further, the facsimile apparatus 21 has the function of discriminating the communication mode of each station in the closed user group based upon the communication mode information stored in the CUG area defined in the RAM 24.

Figure 8:
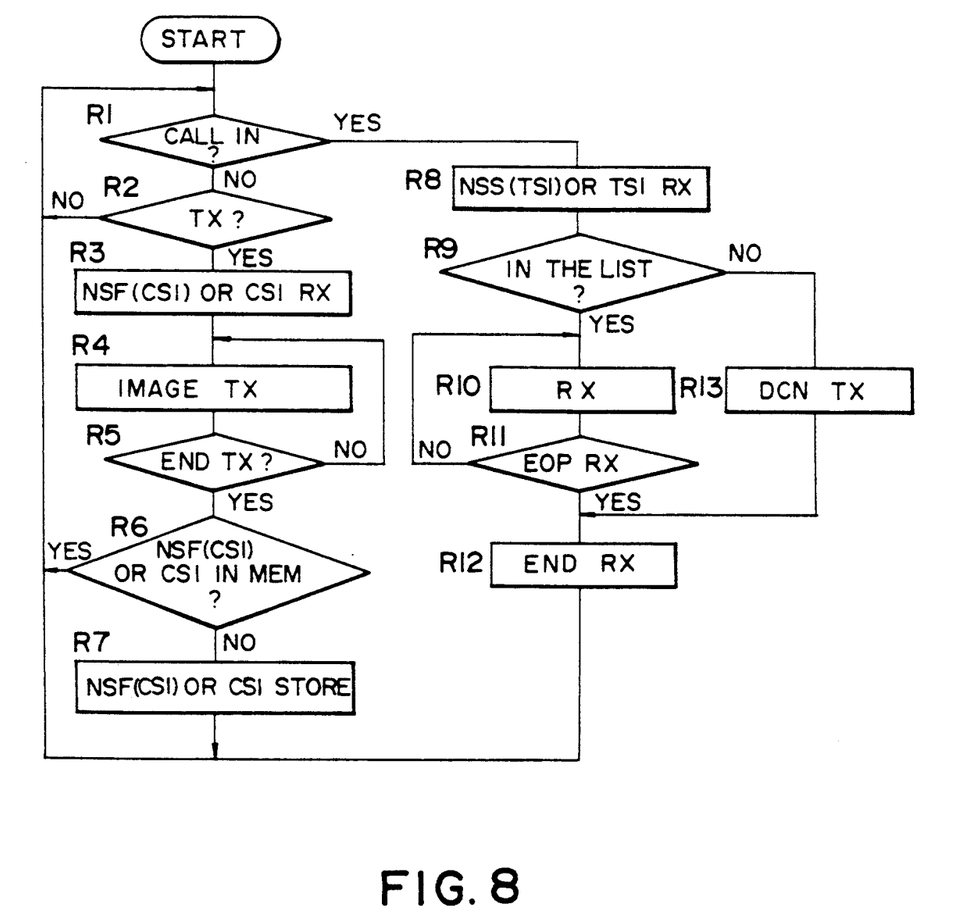
FIG. 8 is a flowchart of the transmission and selective reception process achieved by the facsimile apparatus of FIG. 7.

Referring to FIG. 8, the facsimile apparatus 21 checks, in a step R1, whether there is a call coming in or not and further checks in a step R2 whether there is a request for transmission. When a request for transmission is detected in the step R2, the facsimile apparatus carries out the reception process wherein various control signals are exchanged between the facsimile apparatus and the facsimile apparatus at the calling station. Thus, in a step R3, a detection is made if there is an NSF(CSI) signal or CSI signal coming in or not. Upon reception of the NSF(CSI) or CSI signal, a modem training process is carried out and transmission of image data is made in a step R4. Upon completion of the transmission in a step R5, the RTI data is extracted from the NSF(CSI) signal as the RTI data. Alternatively, the CSI data is recovered from the CSI signal, and a discrimination is made in a step R6 whether the RTI data or the CSI data is already stored in the CUG area of the RAM 24 or not. When the RTI or CSI data is already in the CUG area, then the operation of the facsimile apparatus is returned to the step R1 and the facsimile apparatus waits for the next occurrence of call-in or next occurrence of transmission request. On the other hand, when the RTI data or the CSI data thus obtained is not registered in the CUG area of the RAM 24, the RTI data or the CSI data is stored in the CUG area of the RAM 24 in a step R7 and the operation of the facsimile apparatus returns to the step R1.

Figure 9:
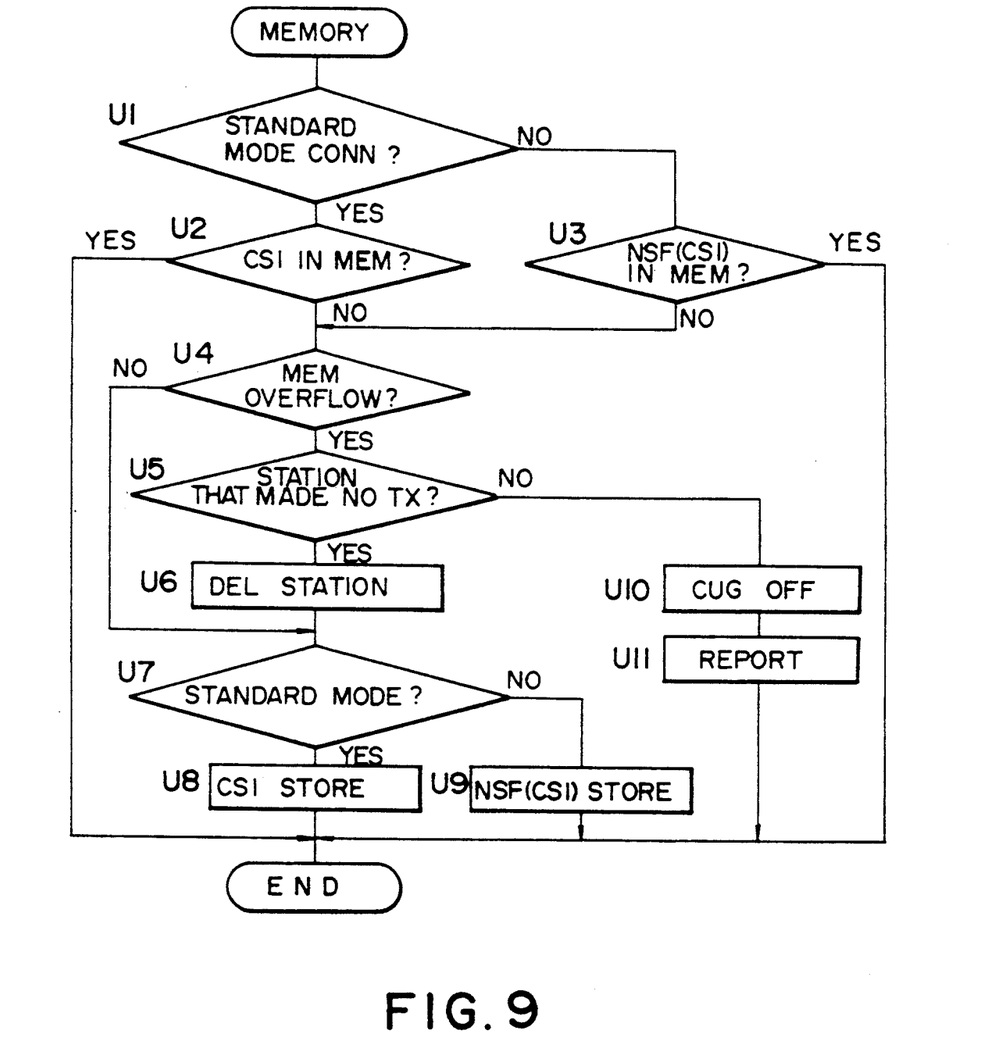
FIG. 9 is a flowchart showing the registration process of the transmitting party identification information together with the transmission mode used by the party.

FIG. 9 shows the registration process carried out in the step R7.

Referring to FIG. 9, the facsimile apparatus discriminates whether the communication mode of the called station is the standard mode or not in a step U1 and if YES, the CSI signal that is returned from the called station in the standard mode is accepted as the CSI data in a step U2. Further, a discrimination is made in the step U2 whether the CSI data thus obtained is already registered in the standard mode area of the RAM 24 or not as the station identification information. When the CSI data is already registered, the registration process is ended.

When the result of discrimination in the step U1 is NO, indicating that the called station is operating in the non-standard mode, then the station identification information is extracted from the received NSF(CSI) signal as the RTI data in a step U3. Further, a discrimination is made in the step U3 whether the RTI data thus obtained is already registered in the standard mode area of the RAM 24 or not as the station identification information. When the RTI data is already registered, the registration process is ended similarly to the case of the step U2.

When the CSI data or the RTI is not yet registered, a check is made in a step U4 whether the memory capacity of the RAM 24 has been exceeded or not in a step U4 and if there is an overflow of memory, a search is made in a step U5 whether there is the CSI data of a station from which no facsimile transmission has been received. This search may be made by using a flag that is set in the area of the CSI data or the RTI data of the station in the RAM 24 together with the CSI or RTI data for indicating that there has been a facsimile transmission from the station in the past. When such a station is found, the CSI or RTI data for that station is erased from the RAM 24 in a step U6 and a check is made in a step U7 whether the communication mode of the called station is the standard mode or not in a step U7. When the communication mode is the standard mode, the CSI data is registered into the RAM 24 as the station identification information in a step U8, while when the communication mode is the non-standard mode, the RTI data is registered into the RAM 24 in a step U9.

When it is discriminated in the step U5 that the RAM 24 is full and yet there is no station that has sent no facsimile transmission in the past, in other words, there is no station that can be deleted from the CUG list, the CUG mode is turned off in the step U10 and a report is issued in a step U11 indicating the turning off of the CUG mode. The format of the report may be stored in the ROM 23 or RAM 24 and the CPU 22 synthesizes the report using the format and the CSI or RTI data. The report may contain messages such as the CUG area of the RAM 24 has caused overflow, CUG function is turned off, and the current list of stations in the CUG. Thereby, the operator of the facsimile apparatus 21 can update and manage the CUG list manually.

Referring to FIG. 8 again, when an incoming call is detected in the step R1, the NSS(TSI) or the TSI signal from the calling station is received in a step R8 and a check is made in a step R9 whether the received station identification information is listed in the RAM 24 or not. In the RAM 24, it should be noted that the station identification information is registered for each communication mode as already described. Thus, the facsimile apparatus 21 detects the communication mode upon reception of the facsimile transmission and checks further the CUG area of the RAM 24 corresponding to the detected communication mode whether the station identification information for the calling station is registered in the searched area or not.

If it is confirmed that the station identification information of the calling station is listed in the CUG area of the RAM 24, a normal reception procedure is carried out in a step R10. Upon reception of the EOP signal indicating the end of image transmission in a step R11, the reception is ended in a step R12. In the case when it is confirmed in a step R9 that the station identification information for the calling station is not included in the CUG list in the RAM 24, the calling station is identified to be the one of which transmission is not admitted. Thus, the DCN signal is issued in a step R13 and the reception is ended in the step R12.

Figures 10A, 10B:
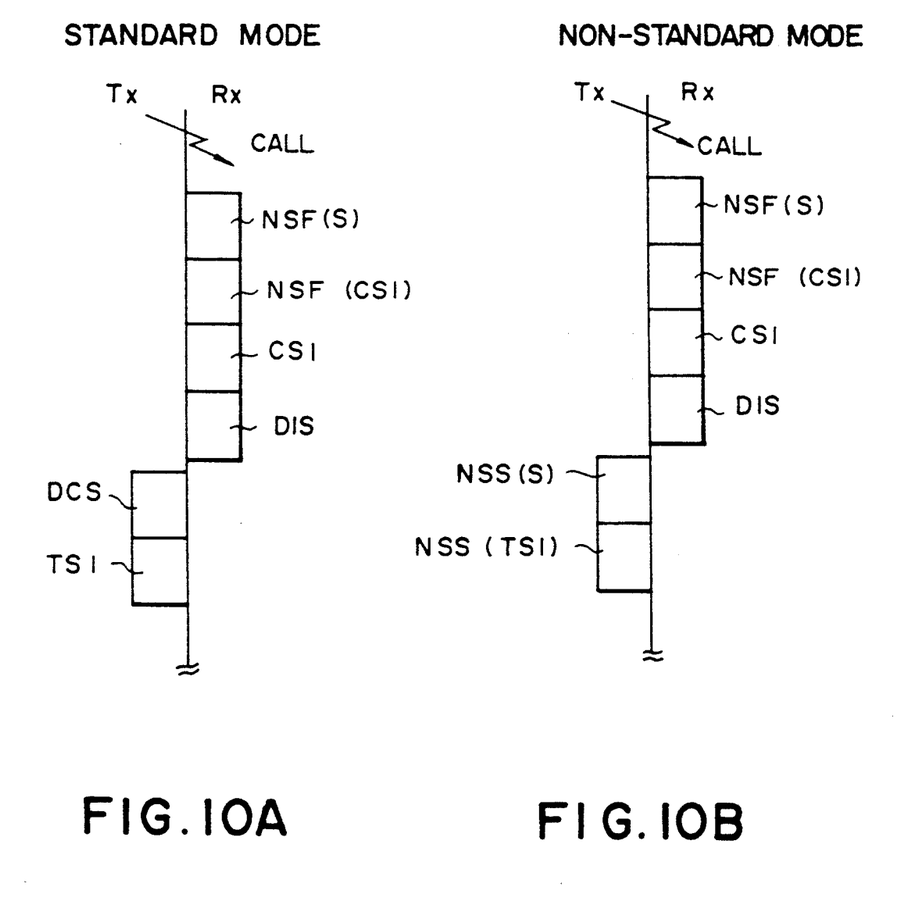
FIGS. 10A and 10B are respectively diagrams showing the reception sequences that are used in the facsimile apparatus of FIG. 7 for the standard mode and for the non-standard mode.

In the facsimile communication system having the standard mode and the non-standard mode, in general, it should be noted that the calling station sends the procedure signal NSS(TSI) or TSI according to its own mode, even when the called station returns the NSF(CSI) signal or the CSI signal as shown in FIGS. 10A and 10B. For example, a standard mode facsimile apparatus at the calling station sends the standard TSI signal (FIG. 10A), or a non-standard mode facsimile apparatus at the calling station sends the non-standard NSS(TSI) signal (FIG. 10B) irrespective of the communication mode of the called station. When the facsimile apparatus 21 is used to receive facsimile transmission, the identification of the calling station with respect to the CUG list in the RAM 24 is made at the same time with the identification of the communication mode of the calling station. Thereby, a reliable and quick check can be achieved whether the calling station is included in the CUG list or not and an efficient management of the CUG connection can be achieved.

Next, a third embodiment of the present invention will be described with reference to FIGS. 11 and 12. In the present embodiment, the construction of the apparatus is identical with that of the apparatus of FIG. 7 and the description thereof will be omitted.

Figure 2:
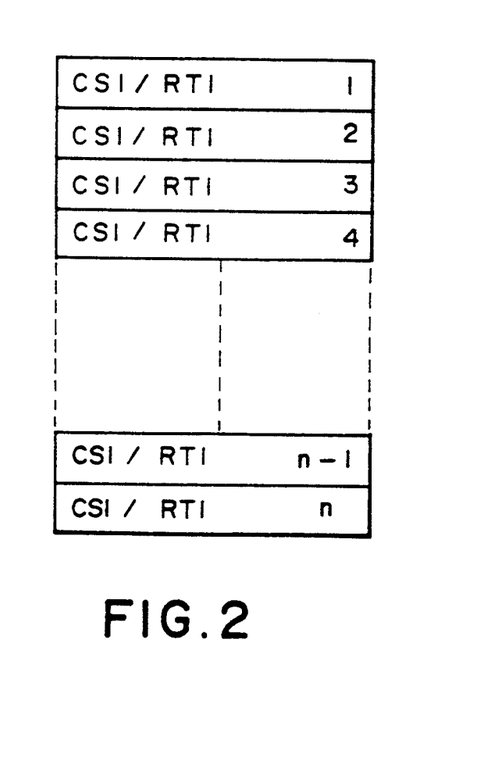
FIG. 2 is a diagram showing the structure of a memory device used in the facsimile apparatus of FIG. 1 for storing the destination terminal discrimination information.

In the ROM 23 of the apparatus 21, the fundamental control program of the facsimile apparatus is stored as usual in addition to the rejection report program that forms the essential part of the present invention. The RAM 24 stores the station identification information as shown in FIG. 2, preferably in correspondence with each communication mode as described with reference to the second embodiment. Further, the CPU 22 controls each part of the facsimile apparatus 21 in accordance with the program in the ROM 23 and achieves further the issuance of the rejection report as will be described.

Next, the operation of the facsimile apparatus of the present embodiment will be described.

Figure 11:
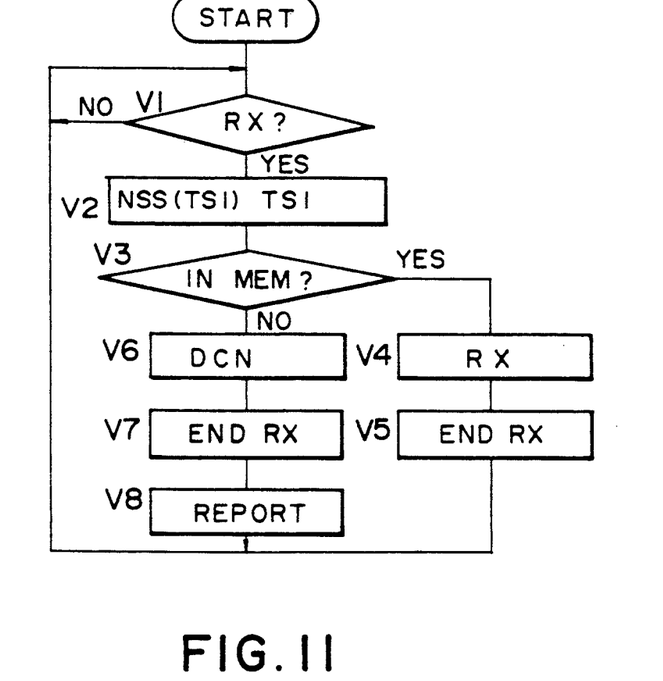
FIG. 11 is a flowchart showing the operation of a third embodiment of the facsimile apparatus of the present invention.
Figure 12:
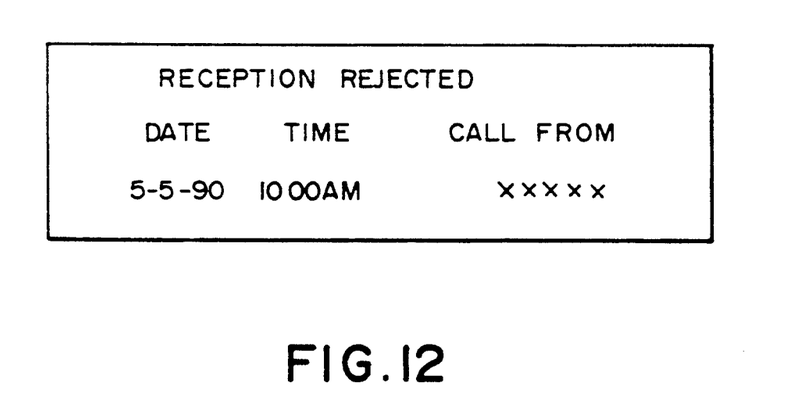
FIG. 12 is a diagram showing an example of the report outputted from the facsimile apparatus of FIG. 11.

Referring to FIG. 11, the facsimile apparatus 21 detects the incoming of a call in a step V1 and receives the NSS(TSI) or the TSI signal from the calling station in a step V2. Upon reception of the NSS(TSI) or the TSI signal, the CSI or the RTI data is extracted and a check is made in a step V3 whether the station identification information corresponding to the calling station is registered in the RAM 24 or not. When it is confirmed that the calling station is registered in the RAM 24, a normal reception process is carried out in a step V4 and the reception is ended in a step V5 upon completion of the facsimile transmission. After the step V5, the operation is jumped to the step V1 wherein the facsimile apparatus waits for the next incoming call.

When it is confirmed in the step V3 that the calling station is not registered in the RAM 24, then the DCN signal is issued in a step V6 indicating disconnection of the line and the rejection of reception is carried out in a step V7 in compliance with the CUG mode. After the rejection in the step V7, the occurrence of rejection of facsimile transmission in the CUG mode is reported in a step V8.

In the step V8, the report is synthesized by using a fundamental document form stored in the ROM 23 or RAM 24, with the date and the station identification information of the calling station added to the report. The report thus synthesized is transferred to the plotter 8 and is recorded on a recording sheet. Thereby, the operator of the facsimile apparatus 21 is informed of the fact that there occurred a rejection of facsimile transmission and the list of the stations that have been rejected. When the rejection occurred erroneously, the operator can correct the station identification information manually including the addition of new stations. The issuance of the report is of course not limited to the recording of a sheet as a hard copy but may be made by displaying the content of the report of an the display unit in the operation/display part 3.

Further, the present invention is not limited to the embodiments described heretofore but various variations and modifications may be made without departing from the scope of the invention.

What is claimed is:

1. A facsimile apparatus for transmitting and/or receiving image data to and from another facsimile apparatus in another station, comprising:

communication control means connected with a communication line for establishing a connection with another station via the communication line, said communication control means sending station identification data to a calling station for identifying own station when a call is received from the calling station, said communication control means further receiving station identification data from a called station, when the facsimile apparatus has made a call to the called station, for identifying the called station;

image data transmission and reception means for transmitting image data to the called station via the communication control means when a call is made to the called station and for receiving image data from the calling station via the communication control means when a call is received from the called station;

image reading means for reading an image and producing the image data corresponding to the image, said image reading means transferring the image data to the image data transmission and reception means for transmission to the called station;

image recording means supplied with the image data received from the calling station from the image data transmission and reception means for recording the image data on a recording sheet as a reproduced image;

memory means for storing the station identification data of selected stations; and memory control means for controlling the memory means such that, when a call is made to a called station, the station identification data that is returned from the called station is stored in the memory means as one of the station identification data of the selected stations;

wherein said communication control means rejects reception of the image data transmitted from the calling station when the calling station is not included in a list of stations stored the memory means.

2. A facsimile apparatus as claimed in claim 1 in which said memory control means controls the memory means such that the number of calls that have been received from the calling station in the past is stored in the memory means, said memory control means checks the memory means, when storing the station identification data of the called station, whether the memory means is full or not, and when the memory means is full, said memory control means controls the memory means such that the station identification data of the station that had sent facsimile transmission in the least frequency in the past is erased from the memory means before storing the station identification data of the called station.

3. A facsimile apparatus as claimed in claim 1 in which said memory control means comprises discrimination means for discriminating whether the facsimile apparatus in the called station is operating in a standard communication mode or in a non-standard communication mode based upon the station identification data that is returned from the called station, and said memory control means further stores mode information in the memory means, in addition to the station identification data, indicating communication mode of the facsimile apparatus in the called station.

4. A facsimile apparatus as claimed in claim 3 in which said memory means comprises a first field for storing the station identification data for stations in which the facsimile apparatus is operated in the standard communication mode and a second field for storing the station identification data for stations in which the facsimile apparatus is operated in the non-standard communication mode.

5. A facsimile apparatus as claimed in claim 3 in which, when receiving a call from a calling station, said communication control means reads out the mode information from the memory means and establishes the connection according to the communication mode used in the facsimile apparatus of the calling station.

6. A facsimile apparatus as claimed in claim 1 further comprising message output means for outputting a message, when the communication control means has rejected the reception of image data, indicating that there occurred a rejection of facsimile transmission.

7. A facsimile apparatus as claimed in claim 6 in which said message output means controls the image recording means such that the message is outputted on the recording sheet.

8. A facsimile apparatus as claimed in claim 1 in which said station identification data comprises numeric data.

9. A facsimile apparatus as claimed in claim 1 in which said station identification data comprises character data.

10. A facsimile apparatus as claimed in claim 1 in which said station identification data is the data defined in the CCITT recommendation for station identification purpose.

* * * * *